Jan. 31, 1933.  E. STIEFEL  1,895,497
PACKING
Filed Oct. 11, 1929
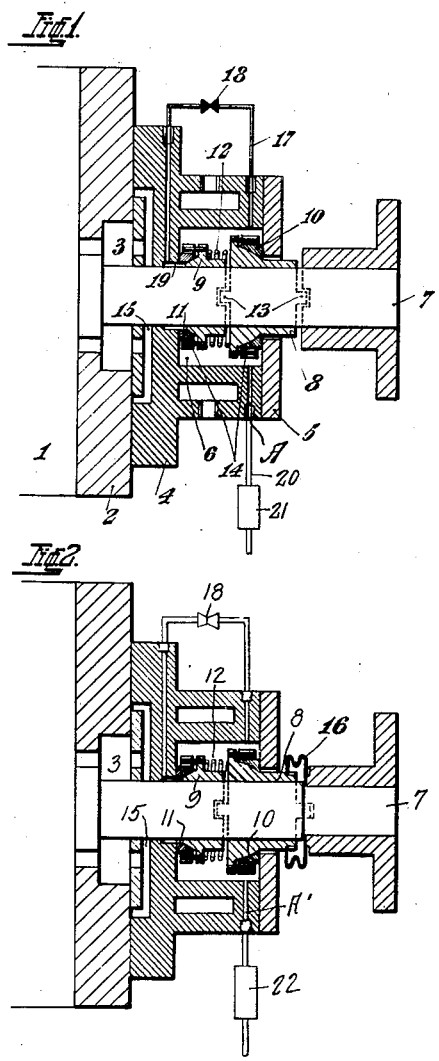

Patented Jan. 31, 1933

1,895,497

UNITED STATES PATENT OFFICE

ERNST STIEFEL, OF BAUMA, SWITZERLAND, ASSIGNOR TO SWISS LOCOMOTIVE AND MACHINE WORKS, OF WINTERTHUR, SWITZERLAND, A CORPORATION OF SWITZERLAND

PACKING

Application filed October 11, 1929, Serial No. 398,880, and in Germany November 7, 1928.

My invention relates to the packing of shafts for rotary refrigerating machines, rotary compressors, rotary vacuum pumps and like machines.

In such machines having rotary pistons it is very difficult to pack fluid-tight the end of the shaft extending out of the stator housing.

This invention has for its object to solve this problem in a reliable and very simple manner.

According to the invention, a packing for shafts of machines of the kind described comprises a stuffing-box chamber containing at least two conical yielding metallic stuffing boxes which are ground on to the shaft and rotate therewith and are pressed by a spring against stationary end covers, and oil forced under pressure through the stuffing-box chamber is led into and thereby lubricates the bearing of the shaft of the machine.

It is desirable to adjust the pressure in the stuffing-box chamber to a desired amount and this end is attained by providing a check valve in a conduit connecting the stuffing-box chamber with the journal box of the shaft.

According to another feature of the invention the outer stuffing-box is connected with the rotating shaft by a diaphragm.

Preferably, an annular chamber is arranged between the inner stuffing box and the journal box, and the oil supplied to the stuffing-box chamber flows from the latter to the annular chamber on its way to the journal box.

One embodiment of the invention and a modification thereof are diagrammatically illustrated by way of example in the accompanying drawing, wherein:—

Figure 1 shows one form of packing according to the invention in section, and

Figure 2 is a like view of a modification thereof.

Like reference characters designate like parts in both views.

According to Figure 1, a housing 1 of a rotary compressor or like machine has its end closed by a cover plate 2 which carries a bearing 3. On the plate 2 is secured an intermediate cover plate 4 which carries a closure plate 5. Between the plates 4 and 5 is formed a stuffing-box chamber 6 which contains two bushings 8 and 9 on a shaft 7 to be packed, and metal washers 10 and 11. The bushings are ground on the shaft, and the washers are ground on the plates 4 and 5 to make fluid-tight face joints. Each bushing and its associated washer, which contact one another on a conical face are connected together by a driving member and together form one element referred to hereinafter as a stuffing-box.

Each packing device thus comprises two stuffing-boxes, whereof one is pressed against the intermediate plate 4 and the other against the closure plate 5 by a spring 12 common to them both. These two plates 4 and 5 are bolted gas-tightly together by bolts not shown and are stationary, whilst the two stuffing boxes rotate with the shaft 7, being driven by the coupling by means of dogs as shown at 13 and 14.

It is not very difficult to provide a ground fluid tight joint between the stuffing boxes and the plates 4 and 5, so that no fluid shall escape, but it is difficult to grind the bushings sufficiently exactly on the shaft to prevent gases and vapors from escaping along the latter.

An oil seal, known in itself, serves to perfect the described packing, the chamber 6 being filled with oil. The stuffing-box chamber filled with oil is subjected to a pressure rather greater than that in the journal box 15 so that no gaseous fluid can pass from the journal box into the stuffing-box chamber. It is therefore not possible for gases to escape to the atmosphere along the shaft as they cannot pass into the stuffing-box chamber. Should any oil tend to drip out, this can be prevented by employing a diaphragm 16 (Figure 2) which connects the bushing 8 oil-tight with the shaft 7.

The stuffing-box chamber 6 is connected by a pipe 17 with the journal box 15. A check valve 18 adjusted to the desired difference of pressure between the two chambers 6 and 15 is provided in the pipe 17. The stuffing-box chamber 6 can be subjected to pressure in two ways:—Firstly, a pipe 20 leading from the oil-separator 21 illustrated diagrammatically in Figure 1 and in which the pressure of the fluid to be sealed, may be connected at A. Secondly, a force pump 22 driven by the compressor and connected at A as illustrated diagrammatically in Figure 2 may produce the requisite pressure. The oil forced in one way or the other into the stuffing-box chamber lubricates the rubbing faces of the packing therein and passes through the pipe 17 into an annular chamber 19 arranged between the plate 4 and the shaft 7, and flows into the journal box 15 where it serves to lubricate the bearing. Because of oil passing from the stuffing-box chamber not directly into the journal box, but indirectly by way of the annular chamber 19, a store of oil is provided in front of the inner stuffing box 9, 14 which ensures the machine being well packed even when it is stationary.

A characteristic feature of the above described packing is that the oil under pressure after flowing through the stuffing-box chamber is supplied to the bearing of the rotor of the machine, but only in such quantity as is absolutely necessary for the lubrication of that bearing. Consequently by this supply the machine receives no more oil, and the apparatus, e. g. in rotary refrigerators, are not more soiled than in a machine, having a stuffing-box without oil circulation, in contradistinction to known constructions in which the oil under pressure after flowing through the stuffing-box chamber is conducted, for example, into the suction pipe of the machine, and thus effects an undesirable additional lubrication. Further, in contradistinction to known diaphragm packing devices, the diaphragm 16, when used, does not have to transmit any frictional forces, as the bushing connected by the diaphragm with the shaft is driven by the shaft independently of the diaphragm. Apart from the diaphragm 16 the construction shown in Figure 2 is similar to that shown in Figure 1.

Various modifications may be made in the details of construction described above without departing from the invention as defined in the claims.

I claim:—

1. A shaft, a casing through an opening in a wall of which the shaft extends into the casing, and means to prevent flow of fluid through said opening into said casing comprising a sealing member snugly slidably mounted on the shaft within the casing and having sealing cooperation with the wall of the casing surrounding the shaft opening therein, means to maintain a liquid under higher pressure within said casing than the pressure of any liquid tending to flow through said opening into the casing, said casing wall having a liquid chamber disposed outwardly with respect to said sealing member and surrounding the shaft, a connection between said chamber and the liquid space within the casing, and a valve in said connection effective to maintain the liquid pressure in said chamber lower than the liquid pressure in the casing.

2. A shaft, a casing through an opening in a wall of which the shaft extends into the casing, and means to prevent flow of fluid through said opening into said casing comprising a sealing member snugly slidably mounted on the shaft within the casing and having sealing cooperation with the wall of the casing surrounding the shaft opening therein, spring means constantly tending to urge said sealing member along said shaft into sealing cooperation with said casing wall, means to maintain a liquid under higher pressure within said casing than the pressure of any liquid tending to flow through said opening into the casing, said casing wall having a liquid chamber disposed outwardly with respect to said sealing member and surrounding the shaft, a connection between said chamber and the liquid space within the casing, and a valve in said connection effective to maintain the liquid pressure in said chamber lower than the liquid pressure in the casing.

3. A shaft, a pressure device from which said shaft extends and from which fluid under pressure tends to escape along said shaft, a casing disposed in fluid tight relationship at one end to said device, said casing having openings in the ends thereof through which the shaft extends, and means to seal the shaft against flow of fluid therealong from said device into and from the casing comprising a pair of sealing members snugly slidably mounted on the shaft within the casing and having sealing cooperation with the inner faces of the end walls of the casing, respectively, spring means between said sealing members constantly tending to urge them apart and into sealing cooperation with said casing end walls, means to maintain a liquid under higher pressure within said casing than the pressure of any liquid tending to flow along the shaft into the casing, means providing a liquid chamber surrounding the shaft between the pressure device and the adjacent sealing member, a connection between said chamber and the liquid space within the casing, and a valve in said connection effective to maintain the liquid pressure in said chamber lower than the liquid pressure in the casing.

4. A shaft, and sealing means therefor as set forth in claim 3 in which a diaphragm connects the sealing member remote from the pressure device with the shaft.

In testimony whereof I affix my signature.

ERNST STIEFEL.